US012746813B2

(12) United States Patent
Miyahara

(10) Patent No.: US 12,746,813 B2
(45) Date of Patent: Sep. 29, 2026

(54) ARRANGEMENT STRUCTURE OF INTAKE DUCT

(71) Applicant: Nissan Motor Co., Ltd., Kanagawa (JP)

(72) Inventor: Kazuki Miyahara, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 217 days.

(21) Appl. No.: 18/682,741

(22) PCT Filed: Aug. 11, 2021

(86) PCT No.: PCT/JP2021/029613
§ 371 (c)(1),
(2) Date: Feb. 9, 2024

(87) PCT Pub. No.: WO2023/017575
PCT Pub. Date: Feb. 16, 2023

(65) Prior Publication Data

US 2024/0424888 A1 Dec. 26, 2024

(51) Int. Cl.
*B60K 1/00* (2006.01)
*B60K 13/02* (2006.01)
*B62D 25/10* (2006.01)

(52) U.S. Cl.
CPC .............. *B60K 13/02* (2013.01); *B62D 25/10* (2013.01)

(58) Field of Classification Search
CPC ............. B60K 13/02; F02M 35/10013; F02M 35/161; F02M 35/10268
See application file for complete search history.

(56) References Cited

U.S. PATENT DOCUMENTS 4,420,057 A * 12/1983 Omote .................. B60K 13/02 123/41.7
5,660,243 A * 8/1997 Anzalone ............... B60K 13/02 180/68.1
8,127,878 B2 * 3/2012 Teraguchi ............. B60K 13/02 180/68.1
9,046,063 B2 * 6/2015 Landgraf .............. B60K 13/02
(Continued)

FOREIGN PATENT DOCUMENTS

DE 1726690 U 7/1956
EP 1745968 B1 8/2011
JP 2002211252 A * 7/2002

*Primary Examiner* — Marc Q Jimenez
*Assistant Examiner* — James J Triggs
(74) *Attorney, Agent, or Firm* — Osha Bergman Watanabe & Burton LLP

(57) ABSTRACT

An arrangement structure of an intake duct includes an air inlet for introducing outside air from outside of a vehicle, a heat bump, an intake duct, and a first shielding member. The heat bump radiates heat to the introduced outside air introduced from the air inlet. The intake duct has an intake port for taking in a part of the introduced outside air. The intake duct is connected to an engine of the vehicle. The first shielding member defines a flow path of the introduced outside air and shielding the intake port from a flow of the introduced outside air. The first shielding member includes at least an upper wall for defining an upper part of the flow path from the air inlet to the heat bump and side walls for defining a side part of the flow path. The intake port is located above the upper wall.

7 Claims, 7 Drawing Sheets

(56) References Cited

U.S. PATENT DOCUMENTS

| | | | | |
|---|---|---|---|---|
| 10,655,577 | B2 * | 5/2020 | Itagaki ............... | H05K 7/20854 |
| 10,662,909 | B2 * | 5/2020 | Miyashita ............ | F02M 35/161 |
| 2011/0017535 | A1 * | 1/2011 | Salvesen .......... | F02M 35/10118<br>180/68.3 |
| 2018/0363599 | A1 * | 12/2018 | Itagaki ................. | F02M 35/104 |

* cited by examiner

ARRANGEMENT STRUCTURE OF INTAKE DUCT

TECHNICAL FIELD

The present invention relates to an arrangement structure of an intake duct.

BACKGROUND ART

The following Patent Literature 1 discloses an intake duct mounting part structure of an automobile in which a radiator core support upper panel is formed with a C-shaped longitudinal section opening rearward and a plurality of air holes are provided in a vertical wall surface of the C-shaped section, and an inlet port of an intake duct is arranged behind the radiator core support upper panel.

CITATION LIST

Patent Literature

Patent Literature 1: Japanese Unexamined Patent Application Publication No. 2002-211252

SUMMARY OF INVENTION

Technical Problem

In a conventional arrangement structure of the intake duct, the air heated by a heat bump such as a radiator flows toward the intake port of the intake duct and may be sucked in the intake duct.

An object of the present invention is to prevent the heated air from being taken in the intake duct.

Technical Solution

An arrangement structure of an intake duct according to one aspect of the present invention includes an air inlet, a heat bump, an intake duct having an intake port, and a first shielding member. The first shielding member includes at least an upper wall defining an upper part of a flow path from the air inlet to the heat bump, and a side wall defining a side part of the flow path. The intake port is located above the upper wall.

Advantageous Effects

According to the present invention, it is possible to prevent the heated air from being taken in the intake duct.

DESCRIPTION OF EMBODIMENTS

Figure 1:
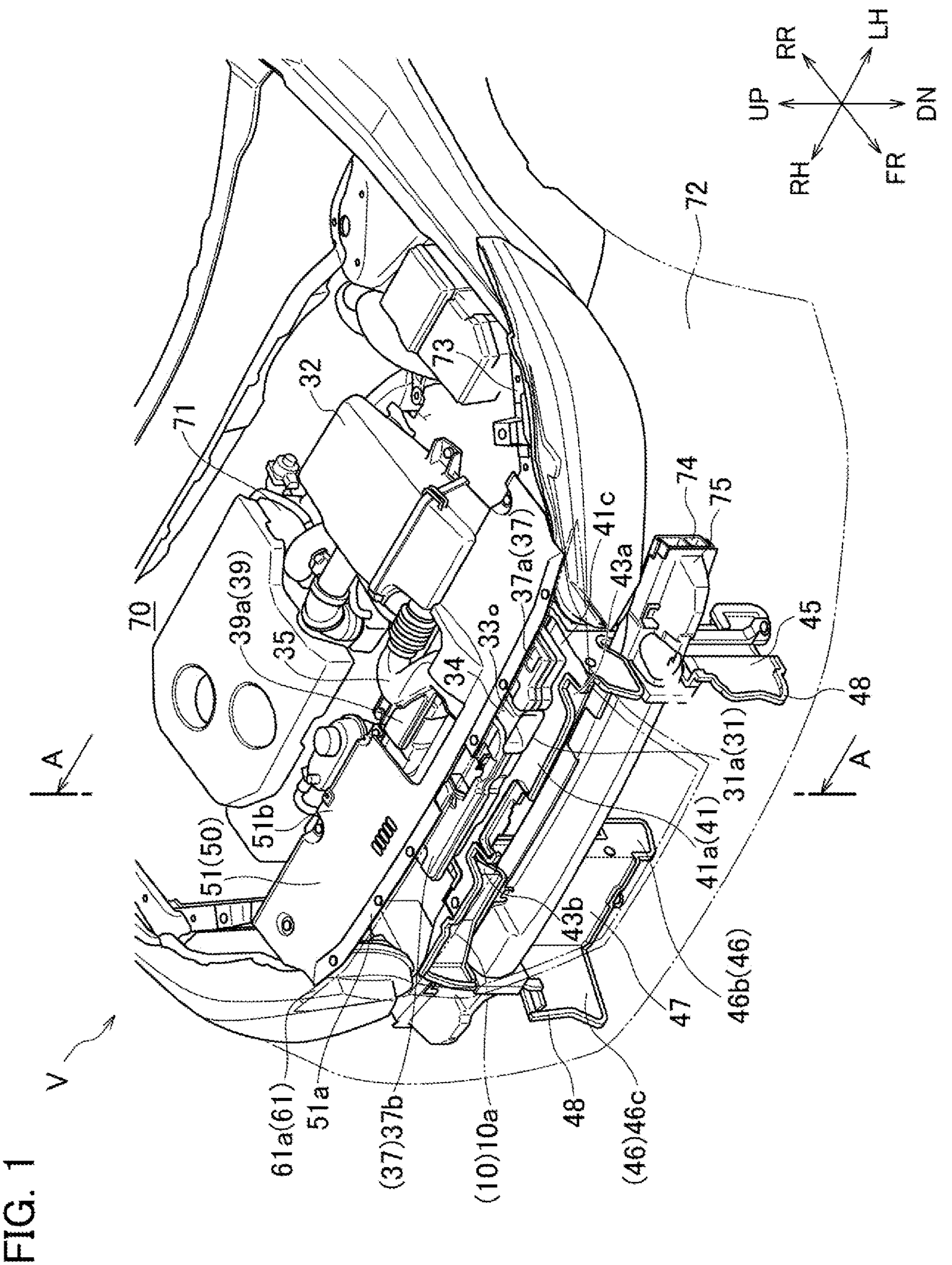
FIG. 1 is a partial perspective view showing an arrangement relationship among an air inlet, an intake duct, a first shielding member, and a second shielding member in a vehicle with an arrangement structure of the intake duct according to an embodiment.

Hereinafter, an arrangement structure of an intake duct according to an embodiment will be described with reference to the drawings. In the drawings, FR and RR denote front and rear in a vehicle longitudinal direction, LH and RH denote left and right in a vehicle width direction, and UP and DN denote an upper side and a lower side in a vehicle vertical direction. In the following description, front and rear in the vehicle longitudinal direction, left and right in the vehicle width direction, the upper side and the lower side in the vehicle vertical direction are simply referred to as "front of vehicle," "rear of vehicle," "left of vehicle," "right of vehicle," "upper side," and "lower side," respectively. Elements having the same function are denoted by the same reference numerals, and duplicate descriptions are omitted.

Figure 2:
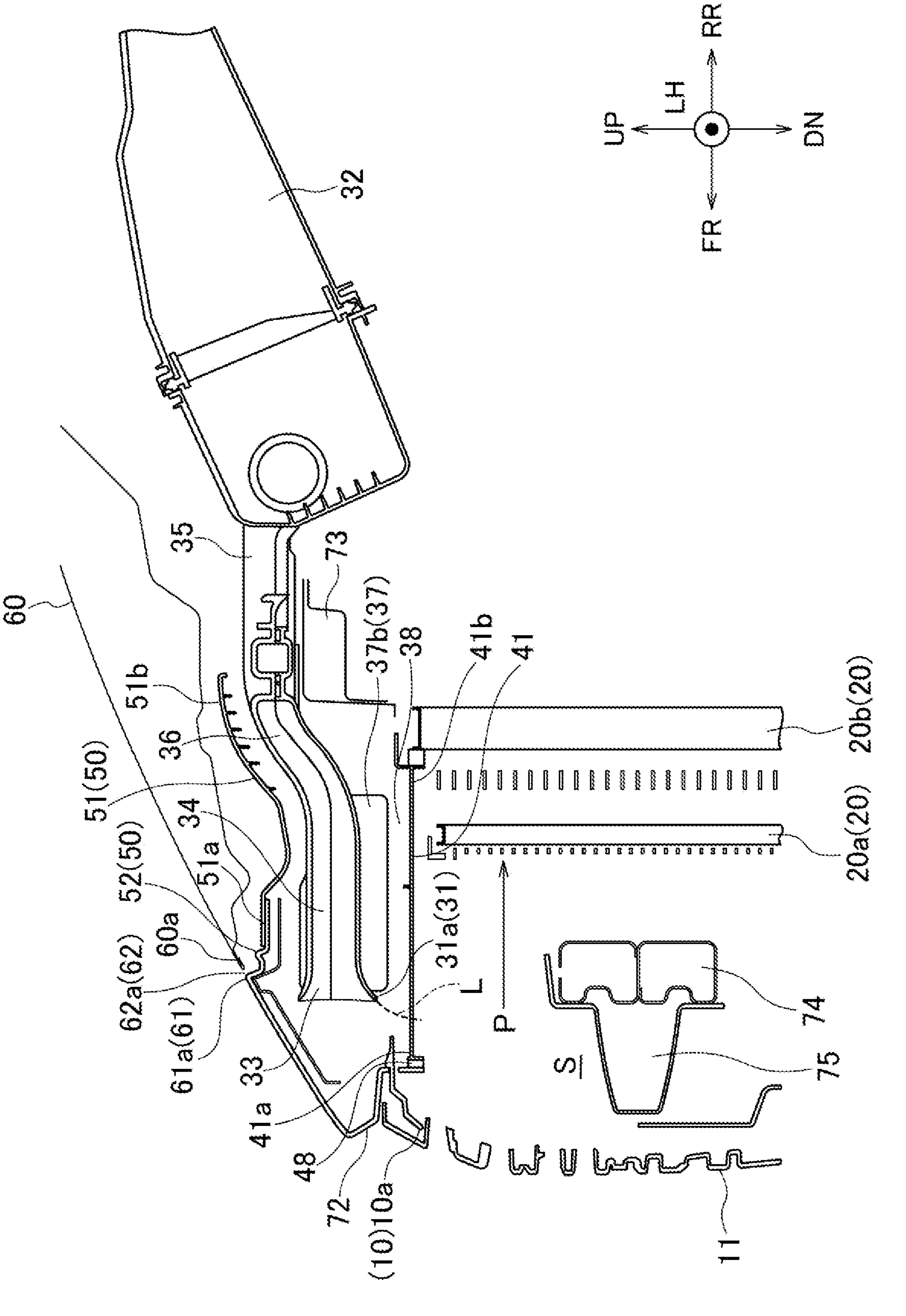
FIG. 2 is a partial cross-sectional view showing the arrangement relationship among the air inlet, the heat bump, the intake duct, the first shielding member, and the second shielding member in a section along line A-A of FIG. 1.
Figure 3:
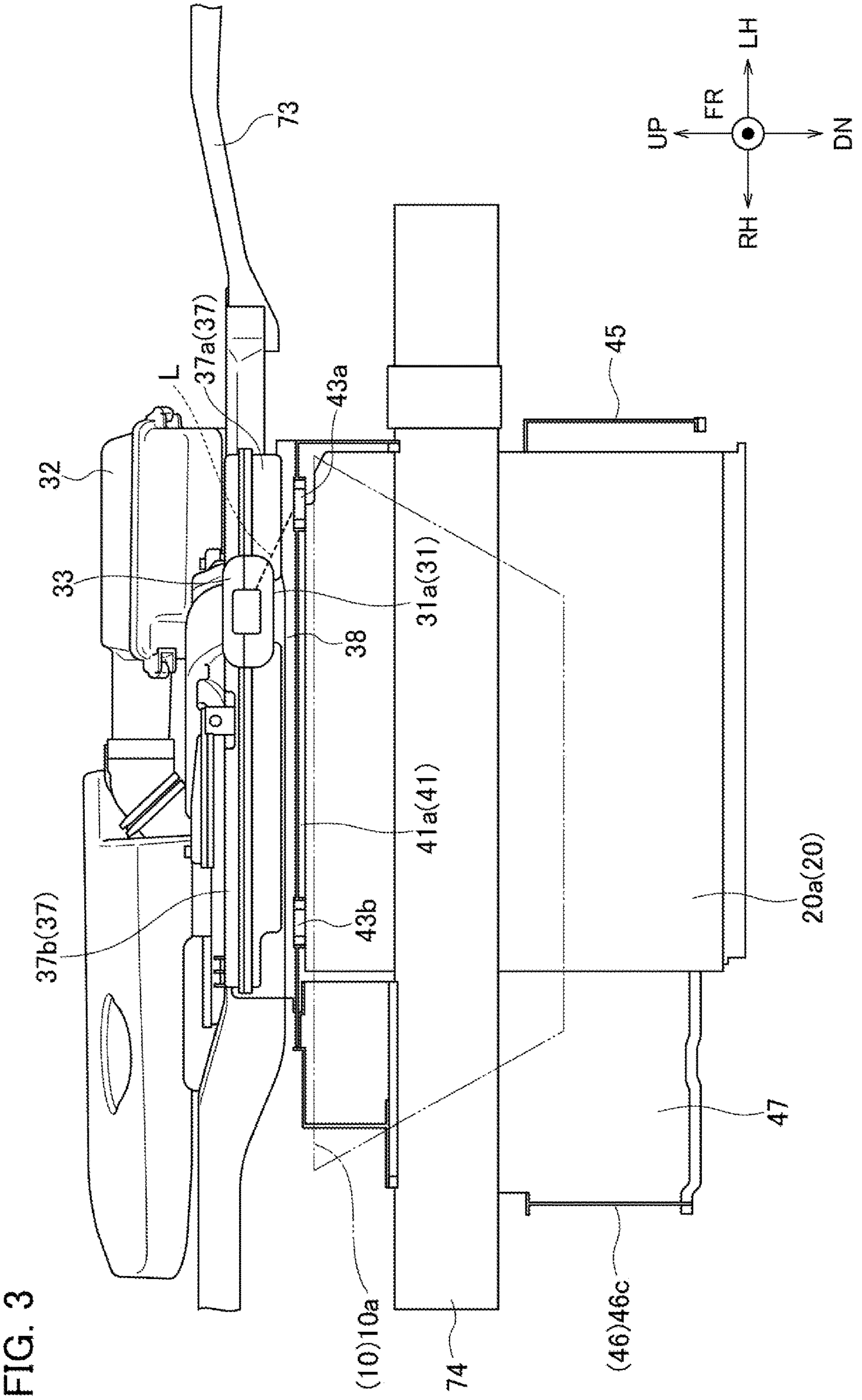
FIG. 3 is a partial front view showing an arrangement relationship among the air inlet, the heat bump, the intake duct, and the first shielding member.

As illustrated in FIGS. 1 to 3, the arrangement structure of the intake duct according to the embodiment can be used in an engine compartment 70 provided on a vehicle front side of a vehicle V. The vehicle V is, for example, a hybrid vehicle powered by an engine 71 arranged in the engine compartment 70 and an electric motor (not shown). The arrangement structure of the intake duct according to the embodiment includes an air inlet 10, a heat bump 20, an intake duct 30, and a first shielding member 40. As illustrated in the drawings, the heat bump 20, the intake duct 30, and the first shielding member 40 may be arranged on the front side of the vehicle relative to the engine 71.

The air inlet 10 is an opening for introducing outside air into the engine compartment 70 from outside of the vehicle V. The air inlet 10 is formed by opening the front side of the vehicle within a predetermined range of body exterior members 72 constituting an exterior of the vehicle V such as a body panel, a bumper, or a hood. In an illustrated example, the air inlet 10 is located in a center portion in the vehicle width direction and has a substantially rectangular shape in the vehicle longitudinal direction. The air inlet 10 may be covered with, for example, a mesh-like or grid-like front grill 11. By providing the air inlet 10, for example, outside air is introduced from the air inlet 10 into the engine compartment 70 as the vehicle V travels forward of the vehicle.

Heat of the heat bump 20 is radiated to the introduced outside air that is introduced from the air inlet 10. The introduced outside air is, for example, air. In the example shown in FIG. 2 or 3, the heat bump 20 includes, but is not limited to, a condenser 20*a* and a radiator 20*b*. For example, the heat bump 20 may be either a condenser 20*a* or a radiator 20*b*.

The condenser 20*a* is a heat exchanger of an air conditioner mounted on the vehicle V for radiating the heat of a refrigerant to the introduced outside air. As in the illustrated example, the condenser 20*a* may be arranged at a predetermined distance from the air inlet 10 on the rear side of the vehicle and may have a substantially rectangular shape in the vehicle longitudinal direction. The radiator 20*b* is a heat exchanger for radiating heat from cooling water of an engine 71 to the introduced outside air. As in the illustrated example, the radiator 20*b* may be arranged at a predetermined distance from the condenser 20*a* on the rear side of the vehicle and may have a substantially rectangular shape in the vehicle longitudinal direction. The radiator 20*b* may be a heat exchanger for radiating heat from the cooling water of the electric motor of the vehicle V to the outside air. As shown in FIG. 3, the heat bump 20 may be arranged closer to a left side than a center of the vehicle in the vehicle width direction in the vehicle longitudinal direction. The air inlet 10 and the heat bump 20 may overlap at least partially in the vehicle longitudinal direction.

As shown in FIGS. 1 to 3, a first shielding member 40 is disposed between the air inlet 10 and the condenser 20*a*. The first shielding member 40 includes at least an upper wall 41 and side walls 45, 46, and covers a space S between the air inlet 10 and the heat bump 20 from an upper side and a lateral side. The first shielding member 40 may be formed by molding a heat-resistant resin material, for example. In the illustrated example, a side of the air inlet 10 of the first shielding member 40 corresponds to the front side of the vehicle, and a side opposite to the air inlet 10 corresponds to the rear side of the vehicle. Since such a first shielding member 40 is provided, it is possible to prevent the introduced outside air from flowing upward, to the left of the vehicle, or to the right of the vehicle from the space S. Therefore, the introduced outside air flows from the air inlet 10 toward the heat bump 20. As a result, as shown in FIG. 2, a flow path P from the air inlet 10 toward the heat bump 20 is formed between the air inlet 10 and the heat bump 20. Thus, the first shielding member 40 is a member defining the flow path P of the introduced outside air.

As shown in the drawings, the upper wall 41 of the first shielding member 40 extends between the intake port 31 of the intake duct 30 and the space S. The side walls 45 and 46 extend on the sides of the space S in the vehicle width direction. Therefore, the first shielding member 40 shields the intake port 31 from the flow of the introduced outside air. As a result, the flow of the introduced outside air introduced into the flow path P is blocked by the first shielding member, and the introduced outside air is prevented from flowing toward the intake port 31.

Figure 6:
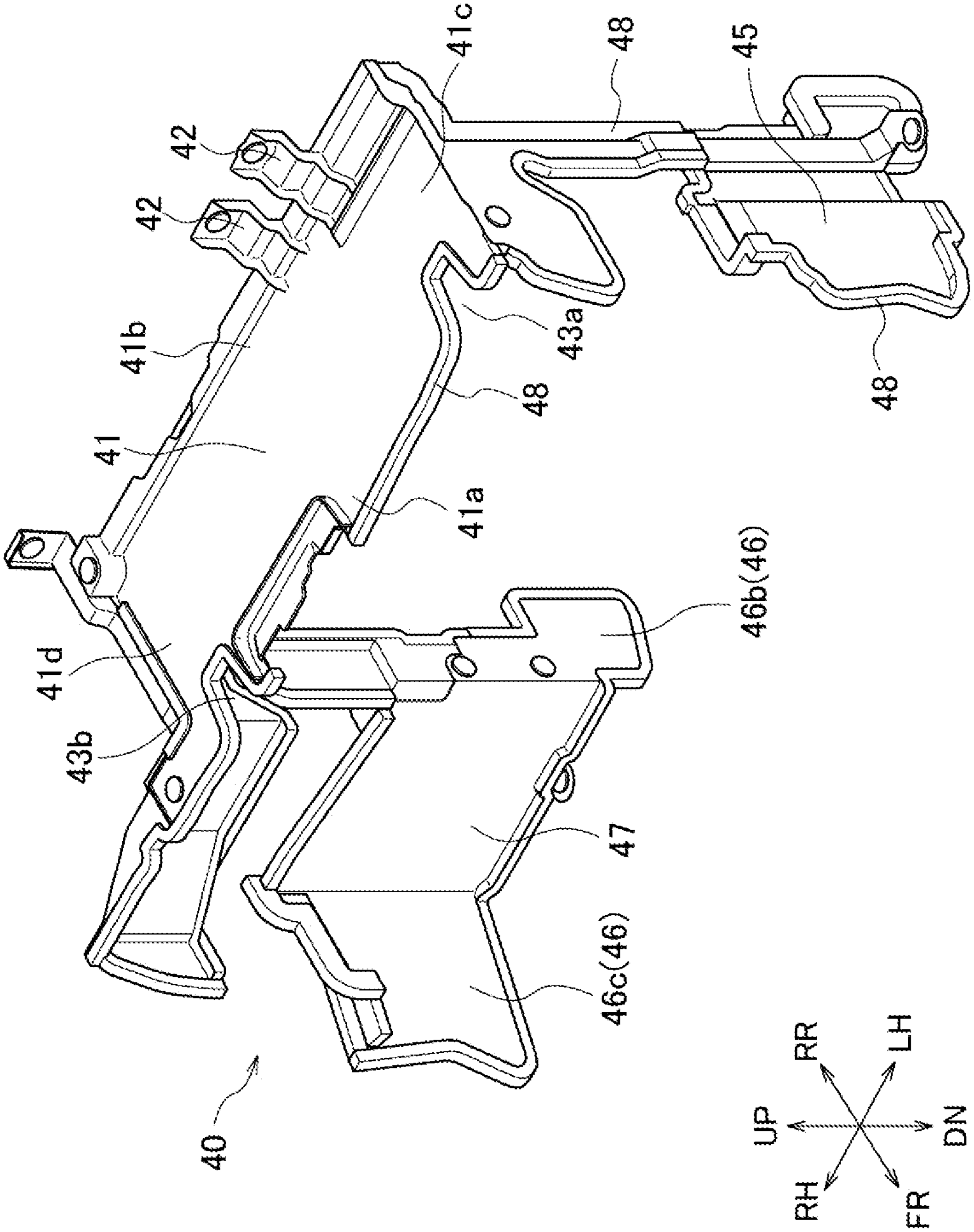
FIG. 6 is a partial perspective view showing the first shielding member.

The upper wall 41 defines an upper part of the flow path P from the air inlet 10 to the heat bump 20. As shown in FIG. 2 or 6, the upper wall 41 is a plate-like part extending in the vehicle longitudinal direction and covering the space S from above, and may have a substantially rectangular shape in a plan view. The upper wall 41 may be arranged above the heat bump 20 to form a predetermined gap to the upper part of the heat bump 20. In addition, the upper wall 41 and the heat bump 20 may be arranged to overlap at least partially in a plan view. It should be noted that the heat bump 20 may be connected to the upper wall 41 through a fastening tool such as a bolt (not shown).

At least a part of an upper wall front end 41*a*, which is an end of the upper wall 41 on the front side of the vehicle, may be formed so that it abuts a part of a vehicle body exterior member 72 that is located above an upper edge 10*a* of the air inlet 10 on the front side of the vehicle, from the inside of the engine compartment 70. In the illustrated example, an upper wall rear end 41*b*, which is an end of the upper wall 41 on the rear side of the vehicle, is located on the rear side of the vehicle relative to the condenser 20*a*, but is not limited thereto. For example, the upper wall rear end 41*b* may be located on the rear side of the vehicle relative to the radiator 20*b*.

A vertical wall portion 42 extending upward may be formed on the upper wall rear end 41*b*. The upper wall 41 may be fixed by fastening the vertical wall portion 42 and a vehicle body framework member 73 above the radiator 20*b* using a fastening tool such as a bolt (not shown). The vehicle body framework member 73 extends in the engine compartment 70 in the vehicle width direction, and may be, for example, a resin or metal radiator core support.

The upper wall 41 has openings 43 penetrating vertically. In the illustrated example, the openings 43 are formed as an opening 43*a* and an opening 43*b* by cutting off the upper wall front end 41*a*. The opening 43*a* is provided as an opening in the upper wall front end 41*a* at a position near an upper wall side end 41*c*. The opening 43*b* is provided as an opening in the upper wall front end 41*a* at a position near an upper wall side end 41*d*. The upper wall side end 41*c* is an end of the upper wall 41 on the left side of the vehicle, and the upper wall side end 41*d* is an end of the upper wall 41 on the right side of the vehicle.

The side walls 45 and 46 define sides of the flow path P from the air inlet 10 to the heat bump 20. In the illustrated example, the first shielding member 40 has the side walls 45 and 46 covering the space S from the side on each of the left side of the vehicle and the right side of the vehicle, but is not limited thereto. For example, the first shielding member 40 may include a side wall on either the left side of the vehicle or the right side of the vehicle.

The side wall 45 covers the space S from the left side of the vehicle, and may be, for example, a plate-like part having a substantially rectangular shape in a side view and extending in the vehicle longitudinal direction. The side wall 45 defines a side part on the left side of the vehicle in the flow path P from the air inlet 10 to the heat bump 20. As in the illustrated example, the end of the side wall 45 on the rear side of the vehicle may abut an end of the condenser 20*a* on the left side of the vehicle. An end of the side wall 45 on the front side of the vehicle may abut a part of the vehicle body exterior member 72 on the front side of the vehicle, that is, a part being located on a part of the air inlet 10 on the left side of the vehicle, from the inside of the engine compartment 70.

The side wall 46 covers the space S from the right side of the vehicle, and may be, for example, a plate-like part having a substantially rectangular shape in a side view and extending in the vehicle longitudinal direction. The side wall 46 defines a side part on the right side of the vehicle in the flow path P from the air inlet 10 to the heat bump 20. As shown in the drawings, the side wall 46 includes a rear side wall 46*b*, a front side wall 46*c*, and an intermediate wall 47, and may have a substantially Z-like shape in a plan view.

The rear side wall 46*b* constitutes a part of the side wall 46 on the rear side of the vehicle. An end of the rear side wall

46*b* on the rear side of the vehicle may abut an end of the condenser 20*a* on the right side of the vehicle. The front side wall 46*c* constitutes a part of the side wall 46 on the front side of the vehicle. It should be noted that an end of the front side wall 46*c* on the front side of the vehicle may abut a part of the vehicle body exterior member 72 on the front side of the vehicle, that is, a part being located on a part of the air inlet 10 on the left side of the vehicle, from the inside of the engine compartment 70 An upper end of the side wall 46 may be fixed to the upper wall side end 41*d* by a fastening tool such as a bolt. In the illustrated example, an upper end of the rear side wall 46*b* is fastened to the upper wall side end 41*d*.

The intermediate wall 47 is a wall extending between an end of the rear side wall 46*b* on the front side of the vehicle and an end of the front side wall 46*c* on the rear side of the vehicle. By providing the intermediate wall 47, the front side wall 46*c* can be arranged on the right of the vehicle relative to the end of the condenser 20*a* on the right side of the vehicle. Therefore, the distance between the side walls 45 and 46 in the vehicle width direction can be formed larger than the dimension of the heat bump 20. Thus, the flow path P of the introduced outside air can be formed larger, and more outside air taken in from the air inlet 10 can be introduced toward the heat bump 20. Therefore, the heat bump 20 can be cooled more reliably.

The sidewall 46 may not include the intermediate wall 47. For example, the sidewall 46 may be a wall extending in the vehicle longitudinal direction between the air inlet 10 and the end of the condenser 20*a* on the right side of the vehicle. Further, the sidewall 46 may extend in an oblique direction to the vehicle longitudinal direction so that the end thereof on the front side of the vehicle is located to the right relative to the end thereof on the rear side of the vehicle in the vehicle width direction.

Further, the first shielding member 40 may include, for example, an elastic part 48 composed of a resin at an end on the front side of the vehicle or at an end on the rear side of the vehicle. In the illustrated example, the upper wall front end 41*a* as well as ends of each of the side walls 45, 46 on the front side of the vehicle end and on the rear side of the vehicle include an elastic portion 48. In this manner, it is possible to prevent a gap from being formed between an end of the first shielding member 40 on the front side of the vehicle and an inner wall surface of the vehicle exterior member 72 on the front side of the vehicle, and between the end of the first shielding member 40 on the rear side of the vehicle and the heat bump 20. Thus, it is possible to prevent the introduced outside air flowing in the flow path P from leaking to the outside of the flow path P, and to realize more efficient heat exchange in the heat bump 20.

The shapes of the sidewalls 45 and 46 can be set as appropriate according to the shape, dimension, or arrangement method of the vehicle V, the air inlet 10, the heat bump 20 and the like. For example, when the heat bump 20 is arranged in a center part in the vehicle width direction, the side wall 45 may include a rear side wall, a front side wall, and an intermediate wall in the same manner as the side wall 46, and may have a substantially Z-like shape in a plan view.

As illustrated in FIGS. 1 to 3, an opening through the vehicle width direction may be formed in a part of the side walls 45 and 46, and a bumper reinforcement 74 for absorbing an impact input in the vehicle longitudinal direction may be arranged in the opening. The bumper reinforcement 74 is a long member extending in the vehicle width direction, and may be composed of a metal such as aluminum, for example. An energy absorbing material 75 formed by molding a resin such as polypropylene may be arranged on the bumper reinforcement 74 on the front side of the vehicle.

An intake duct 30 having an intake port 31 for taking in a part of the introduced outside air is arranged above the first shielding member 40. The intake duct 30 is a piping member for taking in the introduced outside air toward the engine 71, and is connected to a filter 32 in the illustrated example. Further, the intake duct 30 may include an end portion 33, an upstream duct portion 34, and a bent portion 35. The intake duct 30 may be formed by molding, for example, a resin and the like. The intake duct 30 can, for example, take in a portion of the introduced outside air taken in from the air inlet through the opening 43, as shown by the arrow D in FIG. 4. The introduced outside air taken in by the intake duct 30 is introduced into the engine 71 through the filter 32 and mixed with fuel.

The intake port 31 is placed on an edge of the end portion 33 of the intake duct 30 that is located upstream of the intake air. As in the example shown in FIG. 3, the intake port 31 may open toward the front side of the vehicle and have a substantially rectangular shape in the vehicle longitudinal direction. Further, the intake port 31 is located above the upper wall 41. In other words, a lower edge 31*a* of the intake port 31 is arranged above an upper surface of the upper wall 41, and the intake port 31 and the upper wall 41 are arranged such that they overlap at least partially in a plan view. It should be noted that as in the illustrated example, the lower edge 31*a* of the intake port 31 and the upper surface of the upper wall 41 may be separated from each other at a predetermined distance. Furthermore, the lower edge 31*a* and the upper surface of the upper wall 41 may be in contact with each other.

Figure 7:
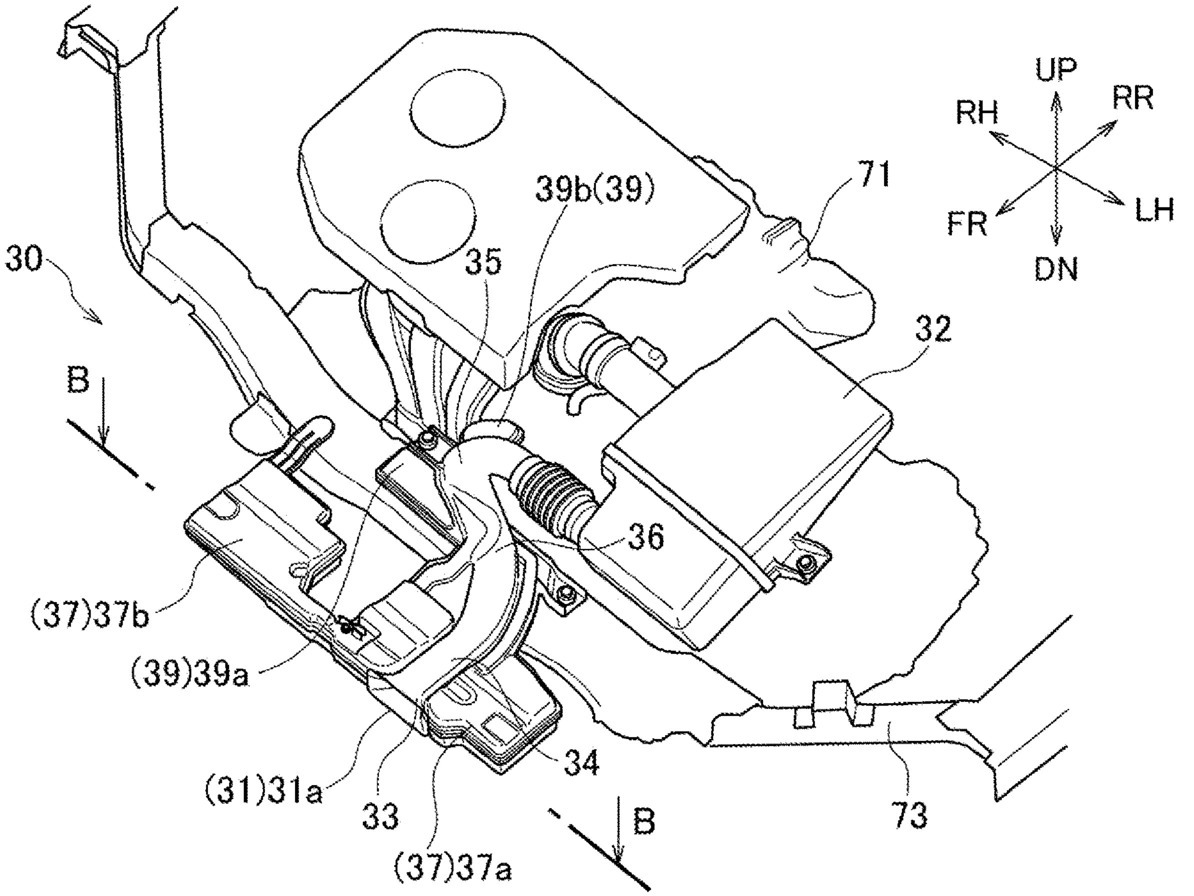
FIG. 7 is a partial perspective view showing an arrangement position of the intake duct.
Figure 8:
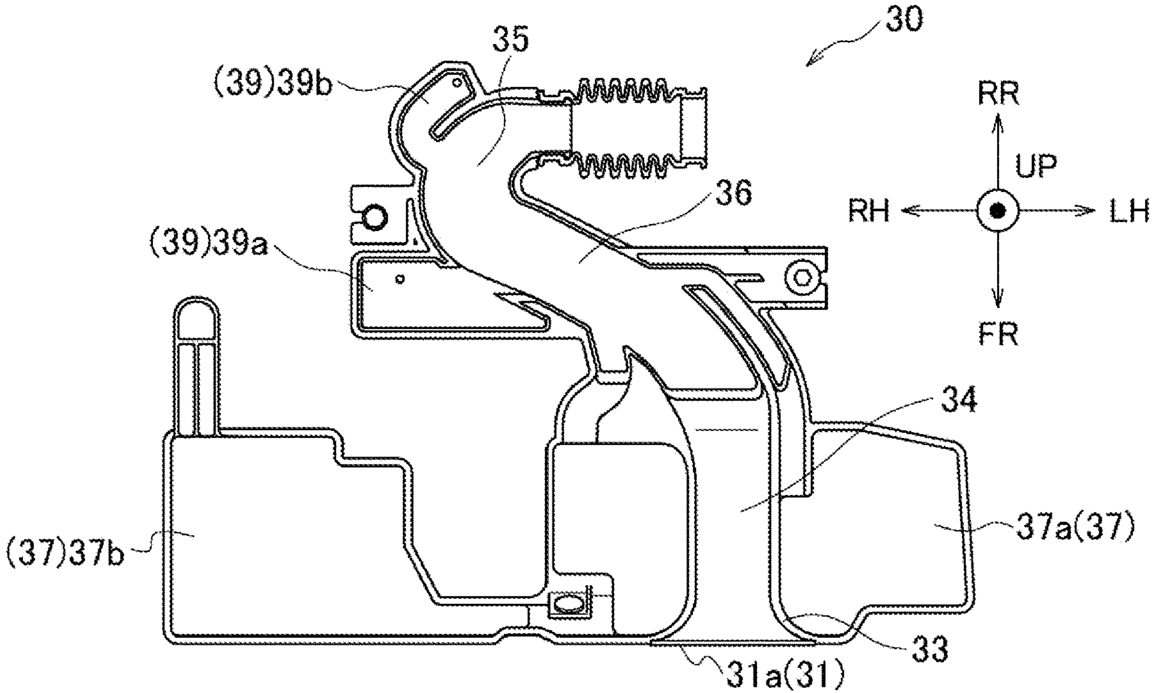
FIG. 8 is a partial cross-sectional view showing a cross section along line B-B of FIG. 7 for explaining the intake duct.

As illustrated in FIG. 7 or 8, the intake duct 30 includes the upstream duct portion 34 extending from the end portion 33. In the illustrated example, the upstream duct portion 34 is a tubular portion extending in the vehicle longitudinal direction and extending from the end portion 33 toward the rear of the vehicle. Further, the upstream duct portion 34 has a substantially rectangular flow path cross-section whose flow path width is larger than the flow path height in the vehicle longitudinal direction. The flow path height is a vertical dimension of the flow path cross-section. The flow path width is a dimension of the flow path cross-section in perpendicular and horizontal directions to an extending direction of the upstream duct portion 34. As shown in the drawings, the upstream duct portion 34 may be connected to the bent portion 35 downstream of the intake air, an intermediate piping portion 36 may be interposed between both portions.

An upstream side of the intake air refers to an upstream side of the air flow taken in the upstream duct portion 34 in a direction parallel to the direction in which the upstream duct portion 34 extends. A downstream side of the intake air refers to a downstream side of the air flow taken in the upstream duct portion 34 in a direction parallel to a direction in which the upstream duct portion 34 extends. In the illustrated example, the front of the vehicle corresponds to the upstream side of the intake air, and the rear of the vehicle corresponds to the downstream side of the intake air.

The bent portion 35 is a piping portion formed by bending a part of piping of the intake duct 30 between the filter 32 and the intake port 31. In the illustrated example, the intermediate piping portion 36 extending from the upstream duct portion 34 downstream of the intake air toward the right rear of the vehicle is bent approximately 120 degrees toward the left of the vehicle to form the bent portion 35. In the illustrated example, the intake duct 30 includes, but is not limited to, one bent portion 35, and may include a plurality of bent portions 35. In other words, at least one bent portion 35 may be formed between the filter 32 of the intake duct 30 and the intake port 31.

The filter 32 is a filter for filtering air taken in the intake duct 30 and is connected to the intake duct 30. In the illustrated example, the filter 32 is an air cleaner having a substantially rectangular hollow box-shaped structure in a plan view. A filter element (not shown) is arranged inside the filter 32. Air taken in the intake duct 30 is introduced into the intake manifold (not shown) of the engine 71 through the filter portion 32. At that time, dust and the like contained in the air is adsorbed on the filter element, and the air can be filtered.

The intake duct 30 may include a resonator 37. In the illustrated example, the resonator 37*a* is arranged on a vehicle left-side and the resonator 37*b* is arranged on a vehicle right-side of the upstream duct 34. The resonators 37*a* and 37*b* have a hollow box-shaped structure that is substantially rectangular in a plan view. The internal spaces of the resonators 37*a* and 37*b* communicate with the intermediate piping portion 36, and a part of the air introduced into the intake duct 30 is introduced into the resonators 37*a* and 37*b*. By providing such a resonator 37, the intake air sound of the engine 71 is resonated in the internal space of the resonator 37, and a predetermined frequency band contained in the intake air sound can be attenuated. Therefore, the generation of the intake sound can be suppressed by the resonator 37.

On an outer peripheral side of the bent portion 35, a second storage 39 which can store contaminants contained in the air and having a specific gravity larger than the air may be arranged. In the illustrated example, second storages 39*a*, 39*b* having a substantially rectangular hollow box-shaped structure in a plan view are arranged on the right side of the vehicle, which is an outer peripheral side of the bent portion 35. Further, the second storage 39 functions as a resonator. A bottom of the second storage 39 may have an opening penetrating in the vertical direction.

Next, the end portion 33 of the intake duct 30 will be described in more detail. In the following description, an axis parallel to an extending direction of the upstream duct portion 34 and passing through a geometric center of the flow path cross-section of the upstream duct portion 34 will be referred to as an upstream duct center axis C1. An axis passing through a center of the vehicle width direction on an upper side of an opening surface of the opening 43*a* and parallel to the extending direction of the upstream duct portion 34 will be referred to as an opening center axis C2. The opening surface of the opening 43 is a surface defined by an inner periphery of the opening 43. A cross section including the upstream duct center axis C1 of the upstream duct portion 34 is referred to as a first cross section. Further, the cross section passing through the upstream duct center axis C1 and the opening center axis C2 is referred to as a second cross section.

Figure 4:
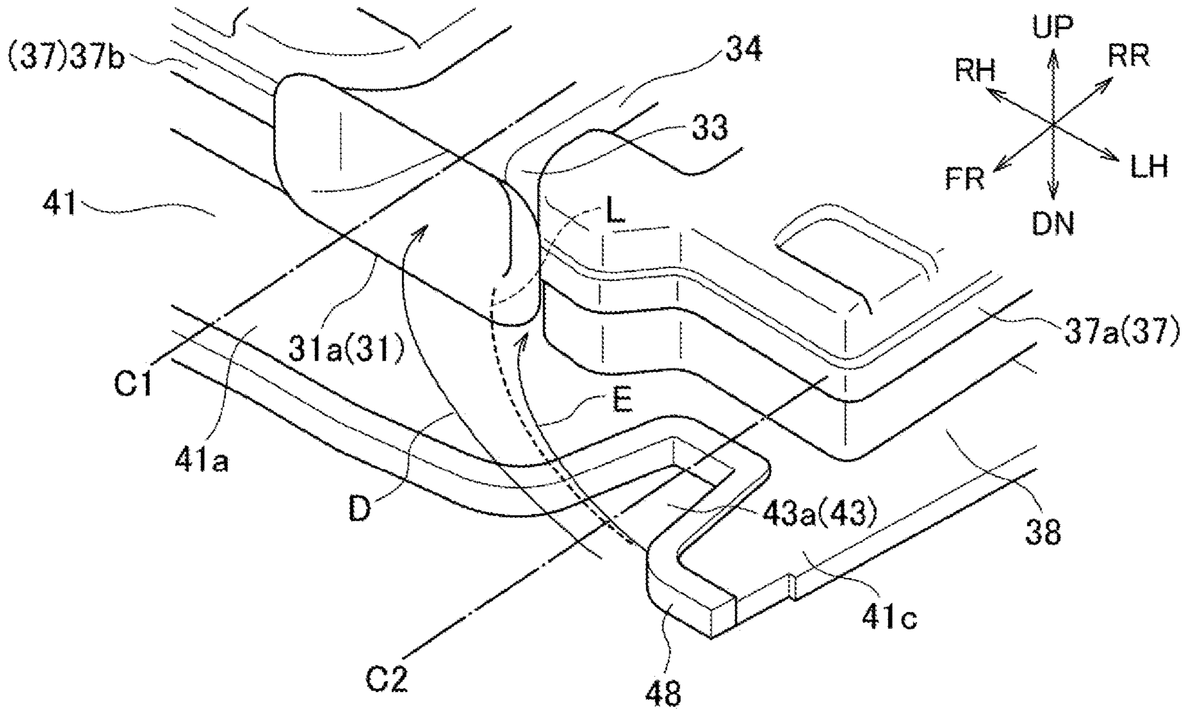
FIG. 4 is a partial perspective view showing an arrangement relationship between the intake duct and the first shielding member.

As shown in FIGS. 2 to 4, the end portion 33 of the intake duct 30 on the side of the intake port 31 is formed in a bell mouth shape which is curved radially outward and expands toward the upstream side of the intake air. The shape of the bell mouth shape of the end portion 33 in the first cross-section can be set as appropriate according to an arrangement position, a shape, or a dimension of the intake port 31 or the first shielding member 40. For example, the bell mouth shape can include an arc, an elliptical arc, a parabola, or a curve smoothly connecting some of them in the second section.

In the illustrated example, an inner surface of the end portion 33 has a shape along a curve L in the second cross section. The curve L is an elliptical arc smoothly connected to the inner surface of the flow path of the upstream duct 34. Thus, the inner surface of a part of the end portion 33 that extends at least toward the opening 43*a* has a curved shape so that it is positioned radially outward toward the upstream side of the intake air. As described above, the curve L may be an arc, a parabola, and the like.

Next, a virtual extension surface F formed by virtually extending a curved surface of the bell-mouth shape from the intake port 31 will be described. The virtual extension surface F is smoothly connected to the inner surface of the end portion 33 at the intake port 31, that is, an edge of the end portion 33.

Figure 9:
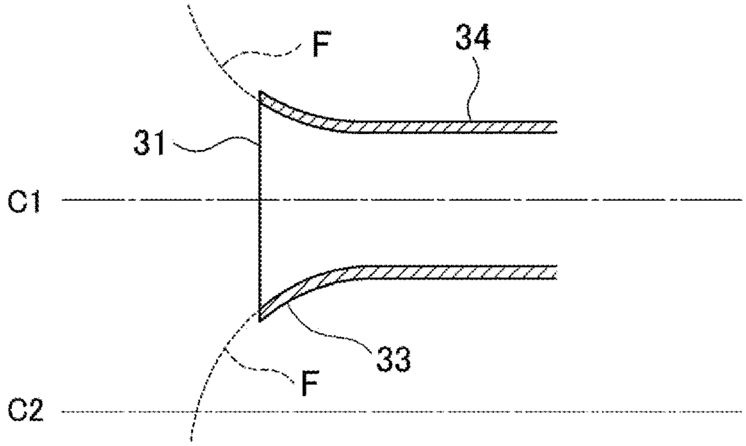
FIG. 9 is a schematic partial cross-sectional view in an axial direction perpendicular to the second cross section for explaining the relationship between an end portion of the intake duct and a virtual extension surface.

In the example shown in FIG. 9, the curve formed by the inner surface of the end portion 33 and the curve formed by the virtual extension surface F follow the same curve in the second cross section. In the example shown in FIGS. 2 to 4, the curve formed by the inner surface of the a part of the end portion 33 that extends toward the opening 43*a* and the curve formed by the virtual extension surface F of the part constitute one curve L in the second cross section. It should be noted that “follow the same curve” means that the curve formed by the inner surface of the end portion 33 and the curve formed by the virtual extension surface F follow a curve represented by one equation whose variable is a position coordinate at least in a direction of the upstream duct center axis C1.

Figure 10:
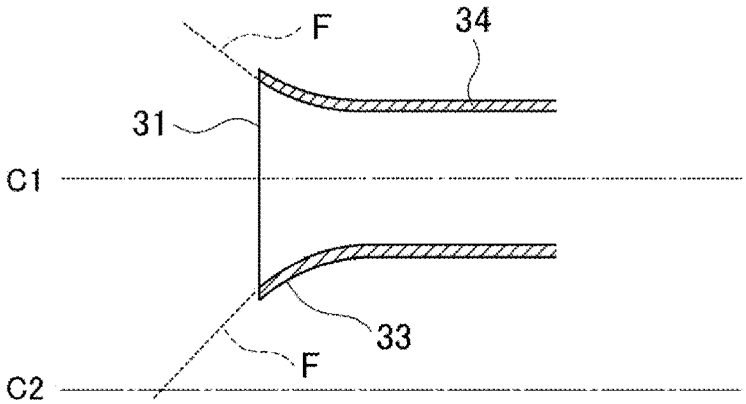
FIG. 10 is a schematic partial cross-sectional view in an axial direction perpendicular to the second cross section for explaining the relationship between the end portion of the intake duct and the virtual extension surface.

As in the example shown in FIG. 10, the virtual extension surface F may be smoothly connected to the inner surface of the end portion 33 at the edge of the end portion 33 in the second cross section and may include a half-line extending radially outward from the edge. That is, the half-line formed by the virtual extension surface F in the second cross section may correspond to the tangent line at the edge of the end portion 33 of the curve formed by the inner surface of the end portion 33 in the second cross section. The smaller angle among the intersection angles formed by the half-line formed by the virtual extension surface F and the upstream duct center axis C1 in the second cross section is 90 degrees or less. That is, the angle between the half-line formed by the virtual extension surface F and the upstream duct center axis C1 is 90 degrees or less.

Figure 11:
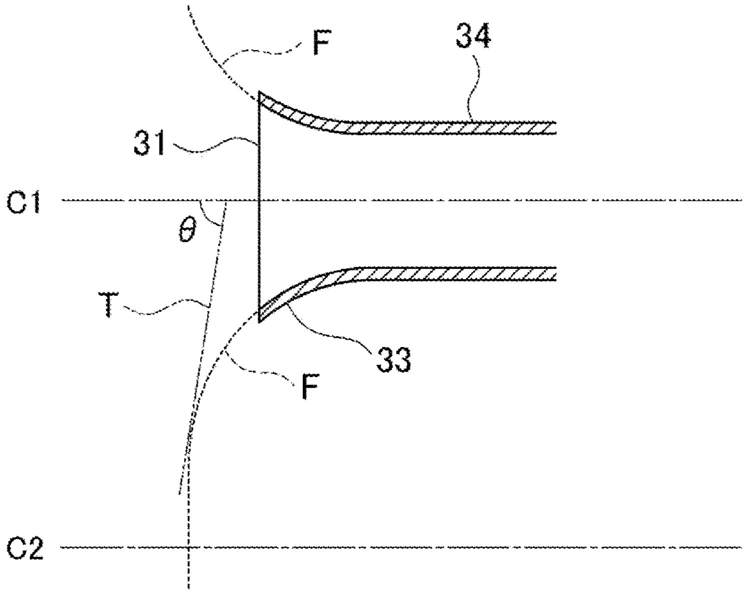
FIG. 11 is a schematic partial cross-sectional view in an axial direction perpendicular to the second cross section for explaining the relationship between the end portion of the intake duct and the virtual extension surface.

In an example shown in FIG. 11, the virtual extension surface F extends from the edge of the end portion 33 so that the curve formed by the inner surface of the end portion 33 and the curve formed by the virtual extension surface F follow the same curve in the second cross section. When the angle θ, which is the smaller angle among the intersection angles formed by the tangent T of the virtual extension surface F and the upstream duct center axis C1 in the second cross section, exceeds 90 degrees, the virtual extension surface F is formed so that the angle θ becomes 90 degrees. That is, in the second cross section, the curve formed by the inner surface of the end portion 33 and the curve formed by the virtual extension surface F may be formed to follow the same curve, and the angle θ between the tangent T of the virtual extension surface F and the upstream duct center axis C1 in the second cross section may be formed to be 90 degrees or less.

Any of the virtual extension surfaces F set as described above may be formed to intersect the opening surface of the opening 43. In the example shown in FIG. 4, the curve L intersects the opening surface of the opening 43*a*. Accordingly, at least a portion of the virtual extension surface F formed by virtual extension from the portion of the end 33 extending toward the opening 43*a* intersects the opening surface of the opening 43*a*. A position of the opening 43*b* may be set so that the virtual extension surface F intersects the opening surface of the opening 43*b*.

Further, as in the example shown in FIG. 3, the opening 43*a* of the upper wall 41 of the intake port 31 may be arranged on the left of the vehicle in the vehicle longitudinal direction, and an opening 43*b* may be arranged on the right of the vehicle. In other words, the opening 43 of the upper wall 41 may be arranged to a side of the intake port 31 in a direction that is vertical and horizontal to the extending direction of the upstream duct portion 34.

Further, as in the illustrated example, the intake duct 30 and the upper wall 41 may be separated at a predetermined distance in the vertical direction. In this way, a gap is formed between the lower edge 31*a* of the intake port 31 and the upper surface of the upper wall 41, and between a bottom surface of the resonator 37 and the upper surface of the upper wall 41. Thus, a first side of the intake port 31 38 is formed between the upper wall 41 and the intake duct 30. The first storage 38 is a space capable of storing contaminants contained in the introduced outside air having a specific gravity larger than the introduced outside air. Further, the first storage 38 is opened between the lower edge 31*a* of the intake port 31 and the upper wall 41. Furthermore, in the vertical direction, the gap between the lower edge 31*a* and the upper surface of the upper wall 41 may be larger than the gap between the bottom surface of the resonator 37 and the upper surface of the upper wall 41. In some embodiments, a vertical dimension of the gap between the lower edge 31*a* and the upper surface of the upper wall 41 may be 10 mm to 30 mm. Further, a vertical dimension of the gap between the bottom surface of the resonator 37 and the upper surface of the upper wall 41 may be 5 mm to 25 mm.

As shown in FIG. 1 or 2, a second shielding member 50 may be disposed between the intake duct 30 and a hood 60 of the vehicle V. The hood 60 is an exterior member that covers the engine compartment 70 of the vehicle V from above, and is composed of a metal such as iron, for example. The hood 60 is rotatably supported by a hinge (not shown) at a predetermined angle range around the shaft on the rear side of the vehicle in the engine compartment 70, and is formed to block a hood opening 61. The hood opening 61 is formed by opening an upper side of the engine compartment 70 of the vehicle body exterior members 72 within a predetermined range. The opening is defined by an inner periphery 61*a* of the hood opening 61.

With the hood opening 61 closed by the hood 60, the inner periphery 61*a* of the hood opening 61 surrounds an outer periphery 60*a* of the hood 60. Then, a gap 62 is formed between the inner periphery 61*a* of the hood opening 61 and the outer periphery 60*a* of the hood 60.

Figure 5:
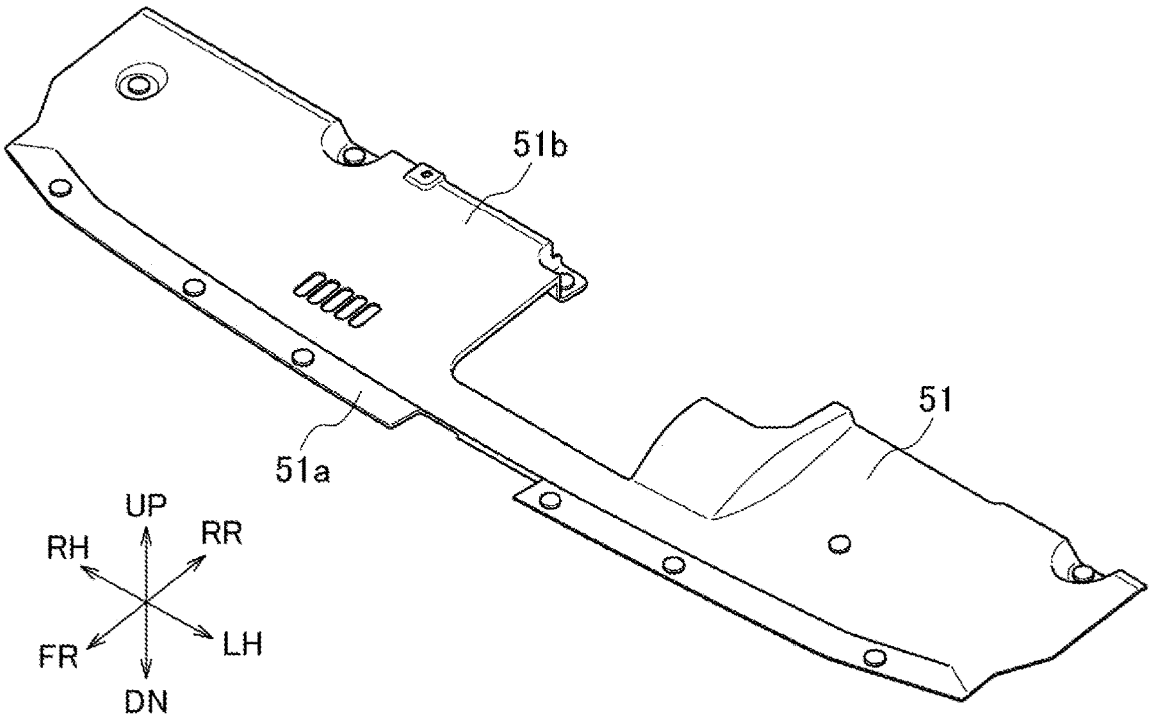
FIG. 5 is a partial perspective view showing the second shielding member.

The second shielding member 50 is a member extending such that it blocks at least a space between a part of gap 62 closest to the intake port 31 and the intake port 31. As illustrated in FIG. 2 or 5, the second shielding member 50 may include a body 51 and a flange 52. As in the illustrated example, the body 51 may be a plate-like member formed by molding a material such as resin and having a substantially rectangular shape in a plan view. The flange 52 may be a wall portion extending toward the rear of the vehicle from a part of the inner periphery 61*a* on the front side of the vehicle. By fastening the flange 52 and the front end 51*a*, which is an end of the body 51 on the front side of the vehicle, by using a fastening tool such as a bolt (not shown), the body 51 can be arranged in the engine compartment 70. In a side view, the rear end 51*b*, which is an end of the body 51 on the rear side of the vehicle, may be formed such that it extends further to the rear of the vehicle relative to the radiator 20*b*.

In the illustrated example, an inner periphery 62*a* of the gap 62 is formed between a part of the inner periphery 61*a* on the front side of the vehicle and a part of the outer periphery 60*a* of the hood 60 on the front side of the vehicle. Further, the flange 52 as the second shielding member 50 and the body 51 extend between the gap front 62*a* and the intake port 31 arranged in the engine compartment 70 on the front side of the vehicle. Therefore, the gap front 62*a* and the intake port 31 are shielded by the second shielding member 50.

It should be noted that aspects of the second shielding member 50 is not limited to the illustrated examples. In some embodiments, the second shielding member 50 may not include the flange 52. In this case, for example, the second shielding member 50 may be arranged so that a front end 51*a* of the body 51 abuts the inner periphery 61*a* of the hood opening 61. Further, the front end 51*a* may abut an area of the hood opening 61 of the body exterior member 72 that extends on the front side of the vehicle, from the inside of the engine compartment 70. Furthermore, an arrangement position and a shape of the second shielding member 50 are not limited to the illustrated examples, and may be set as appropriate according to the position, shape, or size of the intake port 31 or the gap 62.

Hereinafter, the effect of the arrangement structure of the intake duct according to the embodiment will be described.

(1) An arrangement structure of an intake duct according to an embodiment includes an air inlet 10 for introducing outside air from outside of a vehicle V, a heat bump 20 for radiating heat to the introduced outside air introduced from the air inlet 10, an intake duct 30 having an intake port 31 for taking in a part of the introduced outside air, and a first shielding member 40 for defining a flow path P of the introduced outside air and shielding the intake port 31 from a flow of the introduced outside air, and the first shielding member 40 includes at least an upper wall 41 for defining an upper part of a flow path P from the air inlet 10 to the heat bump 20, and side walls 45,46 for defining a side part of the flow path P, and the intake port 31 is located above the upper wall 41. The introduced outside air taken in from the air inlet 10 passes through the flow path P and reaches the heat bump 20 such as a condenser 20*a*. Since the heat bump 20 radiates heat to the introduced outside air, the introduced outside air is heated by the heat bump 20. In the arrangement structure of the intake duct according to the embodiment, the introduced outside air passing through the flow path P and heated by the heat bump 20 is blocked by the first shielding member 40 when it flows upward or laterally from the flow path P. Thus, the introduced outside air that has been heated is prevented from flowing toward the intake port 31. Therefore, the introduced outside air that has been heated can be prevented from being taken from the intake port 31 into the intake duct 30. Furthermore, the power performance of the vehicle V can be improved.

It should be noted that the arrangement structure of the intake duct according to the embodiment may include a vertical wall portion 42 extending upward at a upper wall rear end 41*b* of the upper wall 41 on a side opposite to the air inlet 10, and the vertical wall portion 42 shields at least a part of the air flow flowing toward the intake port 31 from the side opposite to the air inlet 10 across the vertical wall portion 42. In this way, even when a heating element such as an engine 71 is arranged on the rear of the vehicle relative to the intake duct 30 and the first shielding member 40, for example, as shown in FIG. 1, at least a part of the air heated by the heating element is shielded by the vertical wall portion 42. Thus, it is possible to prevent the heated air from being taken from the intake port 31 into the intake duct 30.

(2) In the arrangement structure of the intake duct according to the embodiment, a first storage 38 capable of storing contaminants contained in the introduced outside air and having a specific gravity larger than the introduced outside air is formed between the upper wall 41 and the intake duct 30, and the first storage 38 opens between a lower edge 31*a* of the intake port 31 and the upper wall 41. The introduced outside air that is introduced from the air inlet 10 to the intake port 31 may contain contaminants having a specific gravity larger than the introduced outside air. The contaminants may be, for example, snow, water drops of rain, and the like. Such contaminants may fall down toward the inlet 31 before a part of the introduced outside air is taken in the intake duct 30. For example, snow and the like contained in the introduced outside air and introduced through the opening 43*a* of the first shielding member 40 fall down below the lower edge 31*a* of the intake port 31 by gravity before being taken in the intake duct 30, as shown by arrow E in FIG. 4. In the arrangement structure of the intake duct according to the embodiment, between the intake duct 30 and the upper wall 41, a first storage 38 opening between the lower edge 31*a* of the intake port 31 and the upper wall 41 is formed. Therefore, fallen snow and the like are introduced into the first storage 38 through an opening between the lower edge part 31*a* and the upper wall 41, and is stored in the first storage 38. Thus, it is possible to prevent accumulation of snow and the like contained in the introduced outside air in the intake port 31 on the front side of vehicle and to prevent the snow and the like from being taken in the intake duct 30.

(3) In the arrangement structure of the intake duct according to the embodiment, the upper wall 41 has an opening 43 penetrating vertically, the end portion 33 of the intake duct 30 on a side of the intake port 31 has a bell mouth shape curved and expanding radially outward toward the upstream side of the intake air, and a virtual extension surface F formed by virtually extending the curved surface of the bell mouth shape from the intake port 31 intersects an opening surface of the opening 43. In the arrangement structure of the intake duct according to the embodiment, the intake duct 30 can more reliably take in the introduced outside air through the opening 43 of the upper wall 41 of the first shielding member 40. Further, even when the introduced outside air introduced along a curve L in the second cross section contains snow and the like, as shown in FIG. 4, the snow and the like fall by gravity before being taken in the intake duct 30. The fallen snow and the like are stored in the first storage 38. Therefore, the contaminants contained in the introduced outside air can be fallen down below the intake port 31 and stored more reliably in the first storage 38. Therefore, it is possible to prevent snow and the like from being taken in the intake duct 30 more reliably.

(4) In the arrangement structure of the intake duct according to the embodiment, the intake duct 30 includes an upstream duct portion 34 extending from the end portion 33, and the opening 43 is arranged on a side of the intake port 31 in a direction perpendicular and horizontal to an extension direction of the upstream duct portion 34. In the arrangement structure of the intake duct according to the embodiment, the introduced outside air is taken in the intake duct 30 through openings 43*a*, 43*b* arranged to the left or to the right of the intake port 31 of the vehicle, for example, in the vehicle longitudinal direction. Therefore, it is possible to prevent the introduced outside air from being taken in the intake duct 30 through the area below the front of the vehicle of the intake port 31. That is, it is possible to prevent the introduced outside air from being taken in the intake duct 30 from a lower front side of the intake port 31 in the extending direction of the upstream duct portion 34 of the intake duct 30. Thus, contaminants such as snow contained in the introduced outside air can be more reliably dropped below the intake port 31 and stored in the first storage 38. Therefore, snow and the like can be more reliably prevented from being taken in the intake duct 30.

Further, in the arrangement structure of the intake duct according to the embodiment, the distance between the side edge of the intake port 31 and a part of the inner periphery of the opening 43 that is closest to the intake port 31 in a direction perpendicular and horizontal to the extending direction of the upstream duct portion 34 may be at least larger than the flow path width of the upstream duct portion 34. In this way, the opening 43 can be arranged at a position of the upper wall 41 that is sufficiently distant from the area located in the intake port 31 on a lower front side of the vehicle. Thus, it is possible to prevent the air from being taken in the intake duct 30 through the area of the intake port 31 on the lower front side of the vehicle and the vicinity of the area. As a result, contaminants such as snow contained in the intake air can be more reliably dropped below the intake port 31 and stored in the first storage section 38. Therefore, snow or the like can be more reliably prevented from being taken in the intake duct 30.

(5) In the arrangement structure of the intake duct according to the embodiment, the intake duct 30 is connected to a filter 32 for filtering the air taken in the intake duct 30, at least one bent portion 35 is formed between the filter 32 of the intake duct 30 and the intake port 31, and a second storage 39 capable of storing contaminants contained in the air and having a specific gravity larger than the air is arranged on an outer periphery of the at least one bent portion 35. According to the arrangement structure of the intake duct according to the embodiment, the air taken in the intake duct 30 is introduced into the filter 32 through the bent portion 35. If the air taken in the intake duct 30 contains snow and the like, the snow and the like are introduced into the second storage 39 arranged on the outer periphery of the bent portion 35 by inertia force. Thus, snow and the like can be prevented from being taken in the filter 32 and adsorbed to the filter element. Consequently, the clogging of the filter element can be suppressed, and the deterioration of the power performance of the vehicle V can be suppressed.

The bottom of the second storage 39 may include an opening penetrating vertically. In this way, contaminants such as snow stored in the second storage 39 can be discharged downward from the opening.

(6) The arrangement structure of the intake duct according to the embodiment includes: a hood 60 of the vehicle V; a hood opening 61 of the vehicle V closed by the hood 60; a gap 62 formed between an inner periphery 61*a* of the hood opening 61 and an outer periphery 60*a* of the hood 60; and a second shielding member 50 extending such that it blocks at least a space between a part of the gap 62 closest to the intake port 31 and the intake port 31. In the arrangement structure of the intake duct according to the embodiment, even when, for example, snow enters the gap 62 between the outer periphery 60*a* of the hood 60 of the vehicle V and the inner periphery 61*a* of the hood opening 61, the snow is blocked by the second shielding member 50. Therefore, the deposition of the snow in the vicinity of the intake port 31 can be prevented. Therefore, it is possible to more reliably prevent snow from being taken in the intake duct 30.

In the embodiment described above, the vehicle V as a hybrid vehicle has been described by way of example, but is not limited thereto. Needless to say, the arrangement of the intake duct according to the embodiment can be applied to a vehicle powered only by an internal combustion engine such as an engine. In the above description, a vehicle V having an engine compartment 70 on the front side of the vehicle has been described by way of example, but is not limited thereto. Needless to say, the arrangement structure of the intake duct according to the embodiment can also be applied to a vehicle having an engine compartment 70 on the rear side of the vehicle.

REFERENCE SIGNS LIST

V vehicle
P flow path
F virtual extension surface
10 air inlet
20 heat bump
30 intake duct
31 intake port
31*a* lower edge
32 filter
33 end portion
34 upstream duct portion
35 bent portion
38 first storage
39, 39*a*, 39*b* second storage
40 first shielding member
41 upper wall
43, 43*a*, 43*b* opening
45, 46 side wall
50 second shielding member
60 hood
60*a* outer periphery
61 hood opening
61*a* inner periphery
62 gap

The invention claimed is:

1. An arrangement structure of an intake duct comprising: an air inlet for introducing outside air from outside of a vehicle, a heat bump that has a substantially rectangular shape as viewed in a vehicle longitudinal direction and is for radiating heat to the introduced outside air introduced from the air inlet, an intake duct having an intake port for taking in a part of the introduced outside air, the intake duct being connected to an engine of the vehicle, and a first shielding member for defining a flow path of the introduced outside air and shielding the intake port from a flow of the introduced outside air, wherein the first shielding member includes at least an upper wall formed from a plate-like member that extends in the vehicle longitudinal direction and a vehicle width direction and is for defining an upper part of the flow path from the air inlet to the heat bump and side walls formed from a plate-like member that extends in the vehicle longitudinal direction and a vertical direction and is for defining a side part of the flow path, and wherein the intake port is located above the upper wall.

2. The arrangement structure of the intake duct according to claim 1, wherein a first storage capable of storing contaminants contained in the introduced outside air and having a specific gravity larger than the introduced outside air is formed between the upper wall and the intake duct, and wherein the first storage opens between a lower edge of the intake port and the upper wall.

3. The arrangement structure of the intake duct according to claim 2, wherein the upper wall has an opening penetrating vertically, wherein the end portion of the intake duct on a side of the intake port has a bell mouth shape curved and expanding radially outward toward the upstream side of the intake air, and wherein a virtual extension surface formed by virtually extending the curved surface of the bell mouth shape from the intake port intersects an opening surface of the opening.

4. The arrangement structure of the intake duct according to claim 3, wherein the intake duct comprises an upstream duct portion extending from the end portion, and wherein an opening is arranged on a side of the intake port in a direction perpendicular and horizontal to an extension direction of the upstream duct portion.

5. The arrangement structure of the intake duct according to claim 2, wherein the intake duct is connected to a filter for filtering the air taken in the intake duct, wherein at least one bent portion is formed between the filter of the intake duct and the intake port, and wherein a second storage capable of storing contaminants contained in the air and having a specific gravity larger than the air that is arranged on an outer periphery of the at least one bent portion.

6. The arrangement structure of the intake duct according to claim 1 comprising:

a hood of the vehicle;

a hood opening of the vehicle closed by the hood;

a gap formed between an inner periphery of the hood opening and an outer periphery of the hood; and a second shielding member extending such that the second shielding member blocks at least a space between a part of the gap closest to the intake port and the intake duct.

7. The arrangement structure of the intake duct according to claim 1, wherein the upper wall has an opening penetrating vertically.

* * * * *